Sept. 13, 1966  YUKIO SAITO  3,272,057
DRUM HEAD AND METHOD OF ITS MANUFACTURE
Filed Oct. 19, 1965  2 Sheets-Sheet 1
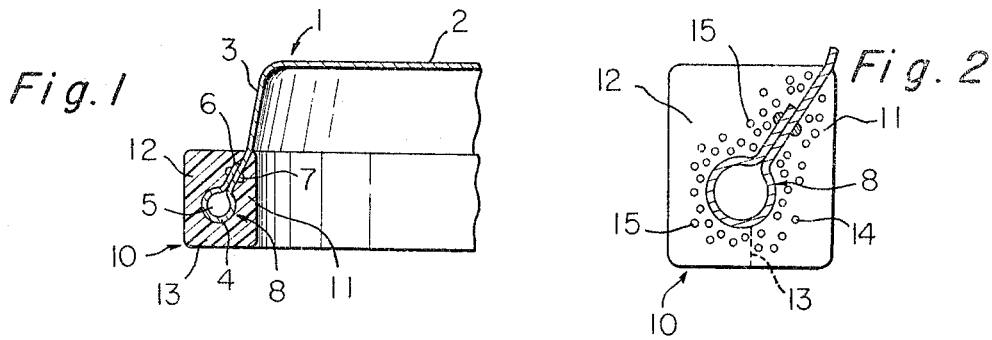
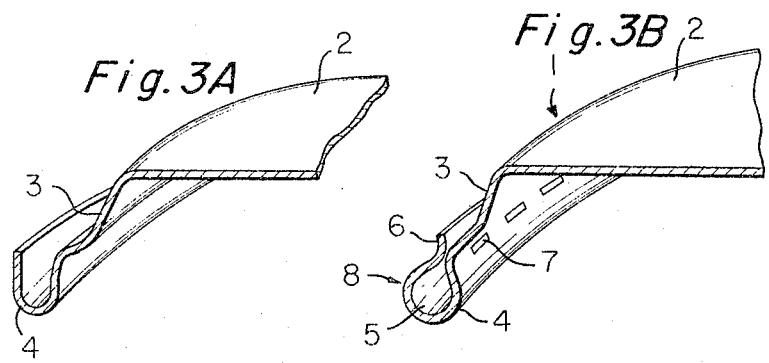
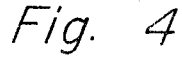
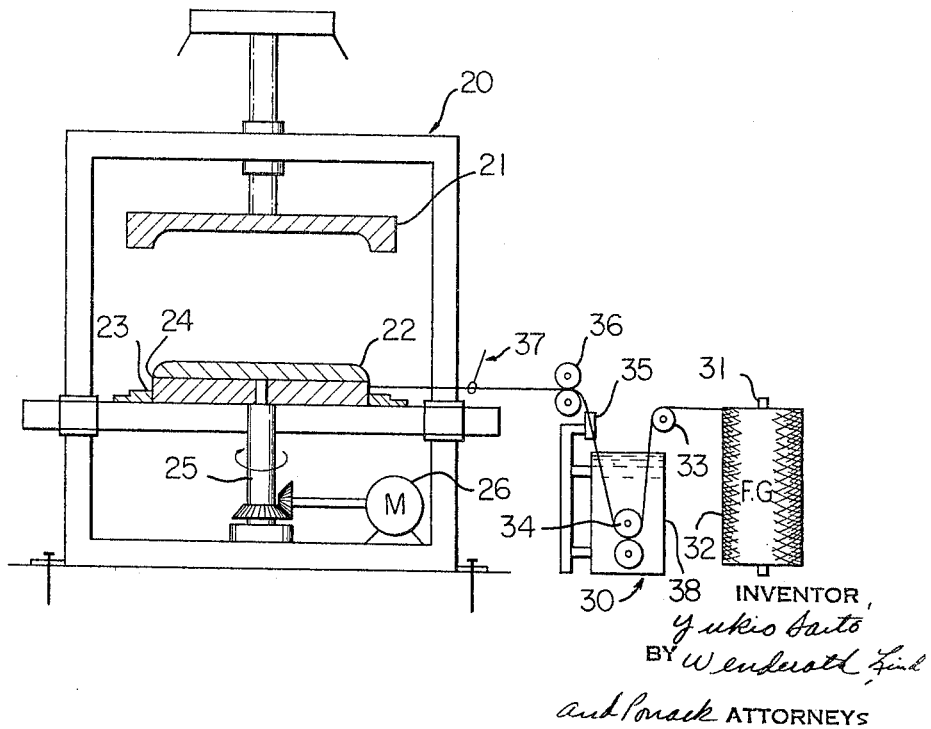
INVENTOR,
Yukio Saito
BY Wenderoth, Lind
and Ponack ATTORNEYS

United States Patent Office 3,272,057
Patented Sept. 13, 1966

3,272,057
DRUM HEAD AND METHOD OF ITS
MANUFACTURE
Yukio Saito, 9 Karasuyama-machi, Nasu-gun,
Tochigi-ken, Japan
Filed Oct. 19, 1965, Ser. No. 497,868
6 Claims. (Cl. 84—414)

This invention concerns a drum head having a novel structure and a method of its manufacture.

It has been known previously that the use of a film of polyethylene terephthalate as a vibratile diaphragm sheet in substitution for animal skins can give a drum head having excellent durability. This vibratile diaphragm sheet however, undergoes a remarkable tension when clamped over the cylindrical body of the drum, which in turn results in the slipping out of the vibratile diaphragm from a supporting frame or the occurrence of its breakage around the anchoring position.

United States patent specification No. 2,934,989, for instance, discloses the securement of the periphery of a vibratile diaphragm sheet to a frame member by inserting the periphery of the sheet into the frame member U-shaped in cross-section and having an opening at the upper part, filling the void with an adhesive synthetic resin, concurrently providing apertures in the edge of the periphery or inserting small dowels into the apertures. But the drum head of the foregoing structure is poor in appearance as the adhesive agent comes out on the upper part, and breakage tends to start from the apertures under tension. There are further defects. The packed adhesive substance has a low strength and does not completely adhere to the film, which results in the crackings or the formation of a void in the boundary.

As above mentioned, the conventional drum heads are commercially less valuable, the securement of a vibratile diaphragm sheet being insufficient.

Accordingly, a main object of this invention is to present a durable and externally beautiful drum head in which a vibratile diaphragm sheet is completely secured to a supporting ring member.

Another object of this invention is to present a method of the manufacture of the said drum head continuously in great quantities.

Other objects and advantages of this invention will become clear from the descriptions which follow.

The above-mentioned objects of this invention can be achieved by a drum head comprising a vibratile diaphragm sheet and a supporting ring member securing the periphery of the said sheet, characterised in that the edge of the said sheet extends downwardly from the periphery, turns outwardly and upwardly, and its end is secured to the lower part of the periphery of the sheet to thereby form an annular void, a rigid annular member, if desired, being inserted into the said annular void, and that an inside and an outside ring-like member composed of a resin-impregnated continuous glass filaments wound in layer are solidified with the edge of the said sheet disposed between them and made into an integral supporting ring.

In a preferred embodiment of the method of this invention, the said drum head is manufactured in accordance with a method comprising the steps of shaping a circular film of a synthetic resin so that it may have a vibratile diaphragm sheet, a periphery and an edge extending downwardly of the periphery and turning outwardly and upwardly; securing the end of the said edge to the lower part of the periphery to form an annular void; winding a thermosetting resin-impregnated glass filaments in layer onto a jig having a diameter smaller than that of the edge; positioning the said edge, i.e., an anchoring ring, on the layer of the resin-impregnated continuous glass filaments; further winding a resin-impregnated continuous glass filaments in layer tightly onto the said edge; and thereafter solidifying the resin with which the glass filaments is impregnated, while heating under elevated pressure.

In accordance with another embodiment of the method of this invention, the said drum head can be manufactured by a method comprising the steps of shaping a circular film of a synethic resin so that it may have a vibratile diaphragm sheet, a periphery and an edge extending downwardly of the said periphery and thereafter turning outwardly and upwardly; inserting an annular rigid member into an annular void of the said edge and securing the end of the edge to the lower part of the periphery; holding the said edge, i.e., an anchoring ring, between an inside ring-like member and an outside ring-like member which are formed by a resin-impregnated glass filaments and are unsolidified and solid; thereafter solidifying the resin with which the glass fiber is impregnated, while heating at elevated pressure.

This invention is further explained with reference to the accompanying drawings in which:

FIG. 1 is a fragmentary view in section of the structure of the drum head of this invention;

FIG. 2 is an enlarged view in section of the supporting ring member of FIG. 1;

FIG. 3A is a fragmentary sketch of the shaped film used in accordance with the method of this invention;

FIG. 3B is a fragmentary sketch showing a state of the annular void formed in the edge of the shaped film;

FIG. 4 is a simplified arrangement of the apparatus for the manufacture of a drum head in accordance with one preferred embodiment of the method of this invention;

Figure 5A:
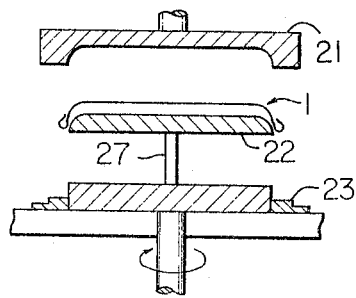
FIGS. 5(A–D) are in brief explanation of the steps of the manufacture of a drum head in accordance with one preferred embodiment of the method of this invention.

In FIGS. 1 and 2, the shaped film 1 consists of a vibratile diaphragm sheet 2, a periphery 3 and an edge 4. It is preferable that this shaped film be made of a tenacious synthetic resin, particularly a biaxially drawn film of polyethylene terephthalate. The said edge 4 turns outwardly and upwardly to form an annular void 5, and its end 6 is secured to the lower part of the periphery 3 by means of an anchoring material 7. Thus, the whole constitutes an anchoring ring. The anchoring material 7 may be a clasp or a sewing thread, and a rigid annular member may be inserted into the annular void 5.

A ring member 10 for supporting the periphery of the said shaped film consists of an inside ring-like member 11 and an outside ring-like member 12, both holding the edge 4 of the shaped film in between. The boundary faces 13 in the lower end of the inside ring-like member 11 and the outside ring-like member 12 are completely integrated owing to the solidification of the resin with which the glass fiber is impregnated by heating under elevated pressure, and there is substantially no boundary layer between them. The said inside ring-like member 11 and the outside ring-like member 12 are made of a resin reinforced by glass filaments 14 and 15, and preferably, the continuous glass filament 15 clamps the edge 4 tightly. The anchoring member of this invention is in complete integral relationship with the vibratile diaphragm sheet. In addition, this anchoring member is tightly clamped by the tension of glass filaments and also fixed fast by the resin solidified by heating under elevated pressure.

Accordingly, the securement of the shaped film to the supporting member is complete even under a high tension. As the supporting member is integral because of the solidification by heating under elevated pressure, the outer surface is very smooth, and there is no fear that a void is formed between the resin layer and the film or cracking occurs in the resin layer.

The method of the present invention is now explained with reference to FIGS. 3 to 6.

A circular film of a synthetic resin such as polyethylene terephthalate is shaped, as shown in FIG. 3A, so that the film may have a vibratile diaphragm sheet 2, a periphery 3 and an edge 4 extending downwardly of the periphery 3 and thereafter turning outwardly and upwardly. Then, as shown in FIG. 3B, the annular void 5 is formed by securing the end 6 of the edge to the lower part of the periphery 3 by means of the anchoring material 7 such as a clasp or a sewing thread. In this case, it may be so constructed than an annular rigid member is embraced by the edge 4. This annular member may be made either of a resin-impregnated glass filament or a material which possesses rigidity after solidification.

Shown by numeral 20 in FIG. 4 is an apparatus for winding and clasping a resin-impregnated filament, which cooperates with a resin-impregnating apparatus 30.

The shaped film 1 manufactured as shown in FIG. 3B is put on a disc-like jig 22 which conforms to the inside face of the sheet 2 and the periphery 3. As shown in FIG. 5A, the said disc 22 is raised by a lifting shaft 26, and the said shaped film is held by jigs 21 and 22 which conform to the outer surface of the shaped film.

The numerals 23 and 24 show winding and tightening jigs which are rotated by a motor 26 and a shaft 25.

The package 32 of the glass filaments is mounted on a shaft 31. The glass filaments are unwound from the package 32, go through a guide 33, pass by means of a guide roll 34 through a bath of a liquid composition of a thermosetting synthetic resin placed in a container 38, and via an adjuster 35, a guide roll 36 and an up-and-down moving guide 37, is wound onto a space defined by jigs 23 and 24, by the rotation of the jigs 23 and 24 themselves.

An example of the liquid composition of a thermo-setting synthetic resin to be used in this invention is shown in the following.

| | Parts by weight |
|---|---|
| Unsaturated polyester | 100 |
| Filler (talc or $CaCO_3$) | 30–60 |
| Stabilizer (fine particles of silicic anhydride) | 2–10 |
| Curing agent (benzoyl peroxide) | 1–5 |

The resinous composition used in accordance with the present invention especially preferably contain a stabilizer such as fine particles of silicic anhydride. The tow of glass filament is impregnated with a resin by passing it through a resin bath. It is preferable that an amount of the resin for impregnation is such that the glass filament accounts for 60–90% by volume, and particularly 70–80% by volume, of the solidified product. As the liquid resinous composition contains a stabilizer, the liquid does not fall in drops after it is impregnated in the glass filament, and the resin-impregnated filament can retain its shape. In addition, it also does not collapse in shape even when it is demounted from the jigs which clamp the filaments.

It is of paramount importance to strictly adjust an amount of the resin-impregnated glass fiber to be wound onto the jigs 23 and 24. The amount is predetermined depending upon a relative position of the jig 24 and the edge 4 of the shaped film.

Figure 5B:
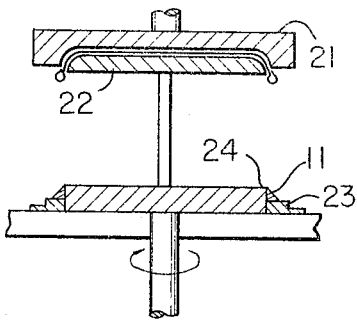

As indicated by FIG. 5B, the shaped film is fixed by causing the jigs 21 and 22 to fall in such manner that the edge 4 of the shaped film 1 is seated on a layer of the resin-impregnated continuous glass filament 11 formed on the jigs.

Figure 5C:
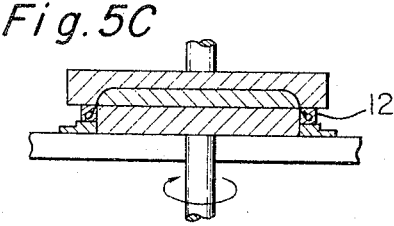

Thereafter, the thus fixed shaped film 1 is rotated, and the resin-impregnated continuous glass filament in layer is tightly wound onto the edge 4, which is then tightly secured by the tension of the glass filament. Such state is shown in FIG. 5C.

Figure 5D:
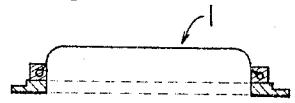
Figure 6:
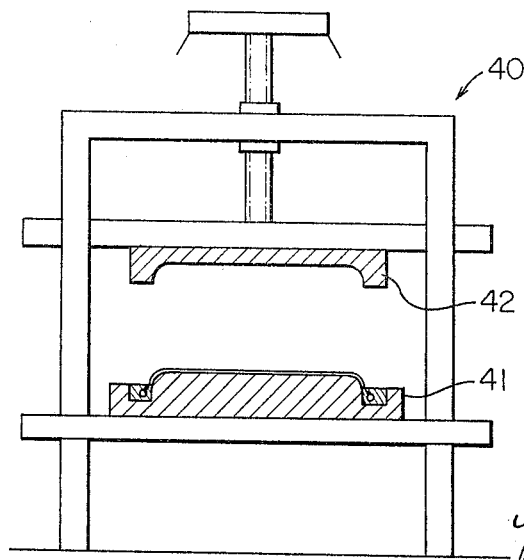
FIG. 6 shows an apparatus for solidifying a resin by heating the supporting ring member of the drum head at elevated pressure.

Thus, a drum head secured by an unsolidified resin-impregnated continuous glass filaments is obtained as shown in FIG. 5D. The steps shown in FIGS. 5A–D can actually be carried out in about 8 seconds.

This unsolidified drum head is pressed and heated by a hot press 40 consisting of a female former 41 and a male former 42 to thereby solidify the resin completely. Generally, it is preferable that a pressure of 5–50 kg./cm.$^2$, a temperature of 120–200° C. and a heating time of about 1–5 minutes are used.

The void 5 formed by the edge 4 remains as it contains a high pressure air and becomes an excellent hook of the shaped film. If a resin-impregnated glass fiber is inserted into the void 5, it becomes a rigid annular member by solidification upon heating, and like the said void, becomes an excellent securement.

What I claim is:

1. A drum head which comprises a vibratile diaphragm sheet and a supporting ring member securing the periphery of the said sheet, characterised in that the edge of the said sheet extends downwardly from the periphery, turns outwardly and upwardly, and its end is secured to the lower part of the periphery of the sheet to thereby form an annular void, a rigid annular member, if desired, being inserted into the said annular void, and that an inside and an outside ring-like member composed of a resin-impregnated continuous glass filaments wound in layer are solidified with the edge of the said sheet disposed between them and made into an integral supporting ring.

2. The drum head of claim 1 wherein the continuous glass filament in the outside ring-like member tightly clamps the edge.

3. A method of manufacturing a drum head which comprises the steps of shaping a circular film of a synthetic resin so that it may have a vibratile diaphragm sheet, a periphery and an edge extending downwardly of the periphery and turning outwardly and upwardly; securing the end of the said edge to the lower part of the periphery to form an annular void; winding a thermosetting resin-impregnated glass filament in layer onto a jig having a diameter smaller than that of the edge; positioning the said edge i.e., an anchoring ring, on the layer of the resin-impregnated continuous glass filament; further winding a resin-impregnated continuous glass filament in layer tightly onto the said edge; and thereafter solidifying the resin with which the glass filament is impregnated while heating under elevated pressure.

4. The method in accordance with claim 3 wherein the film of the synthetic resin is a biaxially drawn polyethylene terephthalate film.

5. The method in accordance with claim 3 wherein the thermosetting resin is a resin of an unsaturated polyester containing a stabilizer.

6. The method in accordance with claim 3 wherein the solidification of the resin, with which the glass filament is impregnated, is carried out at a temperature of 120–200° C. and a pressure of 5–50 kg./cm.$^2$

References Cited by the Examiner

UNITED STATES PATENTS

| 2,934,989 | 5/1960 | Belli et al. | 84—414 |
| 2,979,981 | 4/1961 | Ludwig | 84—411 |

FOREIGN PATENTS 995,993  6/1965  Great Britain.

LOUIS J. CAPOZI, *Primary Examiner.*

C. M. OVERBEY, *Assistant Examiner.*